(12) United States Patent
Chen et al.

(10) Patent No.: US 10,364,312 B2
(45) Date of Patent: Jul. 30, 2019

(54) SHAPE MEMORY POLYMER, PREPARATION METHOD THEREFOR, AND USE THEREOF

(71) Applicant: SHENZHEN UNIVERSITY, Shenzhen, Guangdong (CN)

(72) Inventors: Shaojun Chen, Guangdong (CN); Yangyang Chen, Guangdong (CN); Funian Mo, Guangdong (CN); Haitao Zhuo, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 61 days.

(21) Appl. No.: 15/795,311

(22) Filed: Oct. 27, 2017

(65) Prior Publication Data

US 2018/0044458 A1  Feb. 15, 2018

Related U.S. Application Data

(63) Continuation of application No. PCT/CN2015/077606, filed on Apr. 28, 2015.

(51) Int. Cl.
*C08F 220/34* (2006.01)
*B29C 39/38* (2006.01)
*B29C 39/00* (2006.01)
*C08F 216/20* (2006.01)
*B29K 33/00* (2006.01)

(52) U.S. Cl.
CPC .......... *C08F 220/34* (2013.01); *B29C 39/003* (2013.01); *B29C 39/38* (2013.01); *C08F 216/20* (2013.01); *B29K 2033/08* (2013.01)

(58) Field of Classification Search
None
See application file for complete search history.

(56) References Cited

PUBLICATIONS

Shaojun Chen et al., Development of zwitterionic polyurethanes with multi-shape memory effects and self-healing properties, Journal of Materials Chemistry A, 2015, 2924-2933, vol. 3.

*Primary Examiner* — Catherine S Branch (57) ABSTRACT

The present invention relates to the field of shape memory materials. Specifically, a shape memory polymer, a preparation method therefor, and use thereof are provided. The shape memory polymer is formed by polymerizing methyl ally polyethenoxy ether and 2-(dimethylamino)ethyl methacrylate. The synthesis steps of the shape memory polymer are simplified, the preparation method is simple, and the production cost is low. In addition, the shape memory polymer prepared in the present invention has excellent shape memory performance and high hydrophilicity and biocompatibility, and is suitable for preparing biomedical materials in the field of biomedical science.

9 Claims, 7 Drawing Sheets

SHAPE MEMORY POLYMER, PREPARATION METHOD THEREFOR, AND USE THEREOF

CROSS-REFERENCE TO RELATED APPLICATION

This application is a continuation application of PCT Application No. PCT/CN2015/077606 filed on Apr. 28, 2015, the entire contents of which are hereby incorporated by reference.

TECHNICAL FIELD

The present invention relates to the field of shape memory materials, and specifically to a shape memory polymer, a preparation method therefor, and use thereof.

BACKGROUND

Shape memory effect refers to the phenomenon that a material can sense the environmental change (e.g. temperature, force, electromagnetic, solvent, and other stimulus), and transform regularly into a fixed temporary shape; and then recover back to its initial shape after sensing the external environmental change. Depending on different stimulus conditions, the shape memory material may include, for example, thermosensitive, photosensitive, electrosensitive, or chemosensitive shape memory materials. At present, the polymeric shape memory materials are widely used in the fields of textile, medical treatment, aerospace, engineering and others. A variety of thermally sensitive shape memory polymers are developed through chemical and physical processes and put into use by researchers at home and abroad. However, the overall performance is generally less desirable. For the purpose of meeting the requirements for use in clinic in biomedicine, the thermally sensitive shape memory polymer needs to have a mild stimulus condition close to the body temperature or adaptable to the bioenvironment, a moderate biological compatibility, a suitable strength, and other properties. Therefore, it is a development tendency in current theoretical and application studies to develop a thermally sensitive shape memory polymer with low cost, simple processing process, excellent comprehensive properties and good biocompatibility.

The use of shape memory polymers in biomedicine is always a focus of research, and the researchers in the medical and material science communities at home and abroad endeavor to make the medical polymer materials smart, and put them into use in the field of biomedicine. However, most of the shape memory polymers under research are required to be further improved in terms of the biocompatibility. It is found through clinical research that polyurethane shape memory polymer can cause the inflammatory response in human after long-term implantation. Therefore, there is an urgent need for developing a shape memory polymer having a good biocompatibility and superior comprehensive properties, to meet the requirement for use in clinic in biomedicine.

SUMMARY OF THE INVENTION

In light of the technical problems above, the present invention provides a shape memory polymer with novel structure.

A shape memory polymer is provided, which is formed by polymerizing methyl allyl polyethenoxy ether (TPEG) and 2-(dimethylamino)ethyl methacrylate (DMAEMA), and has a structure represented by Formula I:

Formula I

Preferably, the weight ratio of the raw materials methyl allyl polyethenoxy ether to 2-(dimethylamino)ethyl methacrylate is 8:2-2:8.

Preferably, the weight ratio of methyl allyl polyethenoxy ether to 2-(dimethylamino)ethyl methacrylate in the polymer is 8:2-2:8.

Most preferably, the shape memory polymer has a molecular weight of 10000-100000.

Preferably, the methyl allyl polyethenoxy ether is TPEG2400.

The shape memory polymer of the present invention is synthesized through a route below.

A method for preparing the shape memory polymer comprises: adding methyl allyl polyethenoxy ether, 2-(dimethylamino)ethyl methacrylate, water and an initiator, under the protection of a protective gas, reacting at 50-80° C. for 8-24 hrs with stirring, and drying, to obtain the shape memory polymer.

Preferably, the protective gas is nitrogen.

Preferably, the water is added in an amount of 2-3 times of the total weight of the methyl allyl polyethenoxy ether and the 2-(dimethylamino)ethyl methacrylate.

Preferably, the initiator is ammonium persulfate, and used in an amount of 5-10 mM.

Most preferably, the initiator is used in an amount of 5 mM.

Preferably, the reaction is stirred at 60° C. for 10 hrs.

Preferably, the drying is done through a process comprising: adjusting the mass fraction of the shape memory polymer in the solution to 10-30% after reaction, then pouring the solution into a mold, drying for 12-24 hrs in an air-blowing drier at 80-100° C., and then drying for 12-24 hrs under vacuum, to obtain the shape memory polymer.

Most preferably, the drying is done through a process comprising: adjusting the mass fraction of the shape memory polymer in the solution to 20% after reaction, then pouring the solution into a mold, drying for 24 hrs in an air-blowing drier at 80° C., and then drying for 24 hrs under vacuum, to obtain the shape memory polymer.

Beneficial effect: The shape memory polymer prepared in the present invention has excellent shape memory performance and high hydrophilicity and biocompatibility, and is suitable for preparing biomedical materials in the field of biomedical science.

DETAILED DESCRIPTION

The present invention is further explained below in connection with specific embodiments; however, the present invention is not limited thereto in any way.

In the following examples, the shape fixity ratio and the shape recovery ratio are tested by using a DMA cyclic deformation test method in force control mode. First, a sample strip is fixed in a drawing die of a DMA apparatus and heated to a temperature of 90° C., and the force is adjusted to increase from 0 to 1.0 N, so that the sample strip undergoes deformation. When the deformation exceeds 80%, a tensile deformation E1 is obtained. Then, the temperature is rapidly dropped to 20° C., to fix the deformation for 10 min. Then, the force is adjusted to reduce to 0 N, to obtain a fixed deformation E2. Finally, the temperature is raised to 90° C. again, and maintained for about 40 min. The deformation is recovered. A recovered deformation E3 is obtained. The operations are repeated, to obtain a cyclic deformation curve. Therefore, the shape fixity ratio (F) and the shape recovery ratio (R) of each cycle can be calculated using the following formulas:

$$F = E2/E1 * 100\%$$

$$R = (E2-E3)/E2 * 100\%$$

In the following examples, the contact angle is tested by a static contact angle test method, specifically as described in (Shaojun Chen, *Funian Mo, Yan Yang, Florian J. Stadler, Shiguo Chen, Haipeng Yang, Zaochuan Ge, Development of zwitterionic polyurethanes with multi-shape memory effects and self-healing properties, J. Mater. Chem. A, 2015, 3, 2924.).

Example 1

Under the protection of nitrogen, methyl allyl polyethenoxy ether (TPEG2400, 20 g), 2-(dimethylamino)ethyl methacrylate (DMAEMA, 80 g), and water (200 g) were sequentially added to a three-neck flask, and then an initiator ammonium persulfate (5 mM) was additionally added, and reacted at 60° C. for 10 hrs with stirring. After reaction, the polymer in the solution was adjusted to have a mass fraction of 20%, then poured into a mold, dried for 24 hrs in an air-blowing drier at 80° C., and then dried for 24 hrs under vacuum, to obtain a shape memory polymer, which is designated as TPEG 20 (where 20 indicates that the amount of the raw material TPEG accounts for 20% of the total weight of the raw materials TPEG and DMAEMA).

Figure 1:
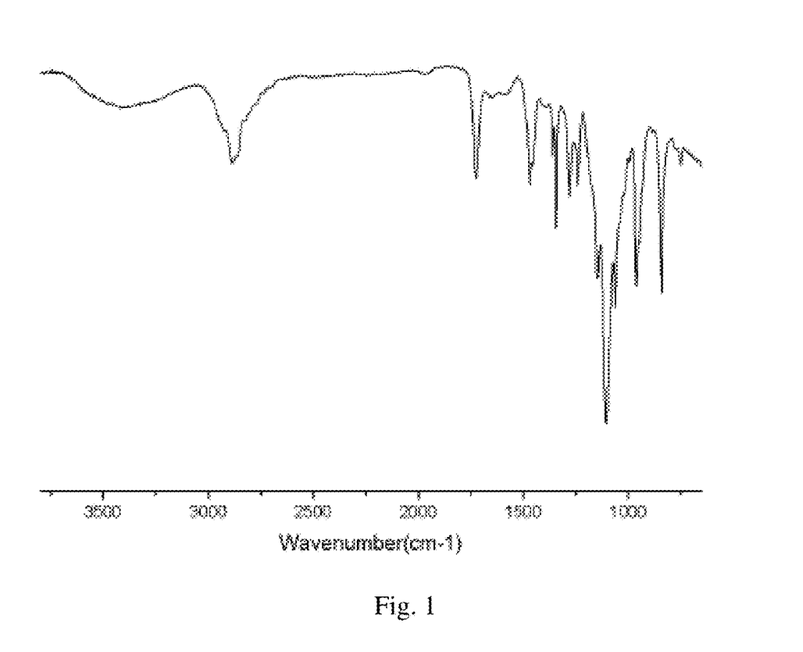
FIG. 1 is an IR spectrum of Sample TPEG20 according to Example 1.

It is found through comparison of the IR spectra of DMAEMA and TPEG that in the IR spectrum of TPEG 20, a C=C vibration peak at 1640 $cm^{-1}$ of DMAEMA is disappeared, suggesting that the raw material DMAEMA is successfully polymerized. In the IR spectrum of TPEG 20, there are a C=O vibration peak appeared at 1721 $cm^{-1}$ and a C—O—C vibration peak appeared at 1104-1146 $cm^{-1}$, suggesting that the DMAEMA and the TPEG are successfully polymerized into TPEG 20, as shown in FIG. 1. The 1H-NMR spectrum of TPEG 20 shows a methyl proton signal (—N(CH$_3$)$_2$) of DMAEMA detected at 2.19 ppm; a methylene proton signal (—CH$_2$—N(CH$_3$)$_2$) of DMAEMA detected at 2.63 ppm; a methylene proton signal (—CH$_2$—CH$_2$—O—) of TPEG detected at 3.52 ppm; and a terminal —OH proton signal of TPEG detected at 3.11 ppm. The 1H-NMR spectrum shows that the DMAEMA and the TPEG are successfully polymerized into TPEG 20.

Figure 2:
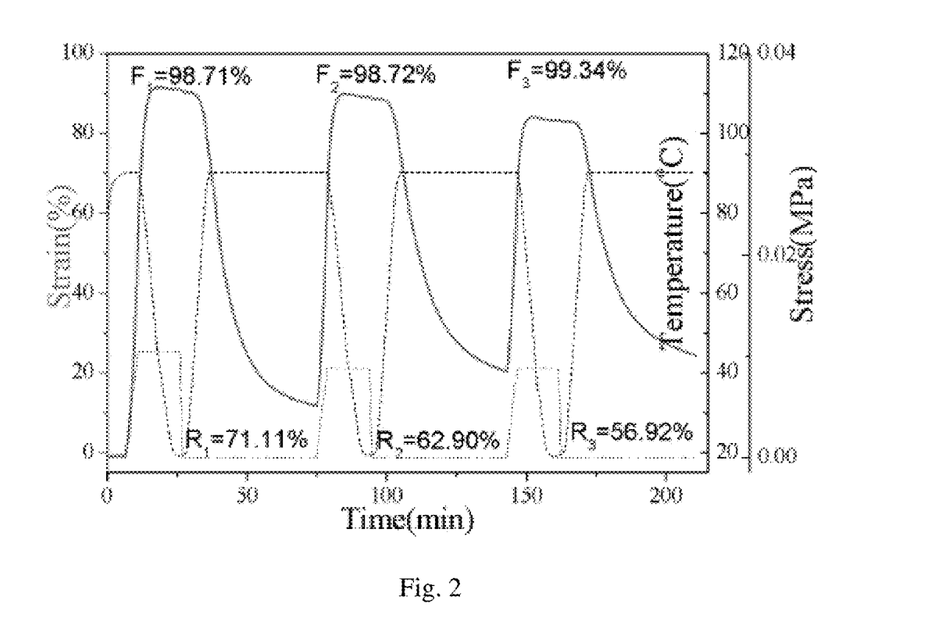
FIG. 2 is a dual-shape-memory cyclic curve of Sample TPEG20 according to Example 1.

The prepared sample TPEG20 exhibits a good dual shape memory performance. As shown in FIG. 2, the initial shape fixity ratio is about 98.71%, and the primary shape recovery ratio is about 71.11%; the secondary shape fixity ratio is about 98.72%, and the secondary shape recovery ratio is about 62.90%; and the tertiary shape fixity ratio is about 99.34%, and the tertiary shape recovery ratio is about 56.92%.

Example 2

Under the protection of nitrogen, methyl allyl polyethenoxy ether (TPEG2400, 30 g), 2-(dimethylamino)ethyl methacrylate (DMAEMA, 70 g), and water (200 g) were sequentially added to a three-neck flask, and then an initiator ammonium persulfate (5 mM) was additionally added, and reacted at 80° C. for 10 hrs with stirring. After reaction, the polymer in the solution was adjusted to have a mass fraction of 30%, then poured into a mold, dried for 12 hrs in an air-blowing drier at 80° C., and then dried for 24 hrs under vacuum, to obtain a shape memory polymer, which is designated as TPEG 30 (where 30 indicates that the amount of the raw material TPEG accounts for 30% of the total weight of the raw materials TPEG and DMAEMA).

Figure 3:
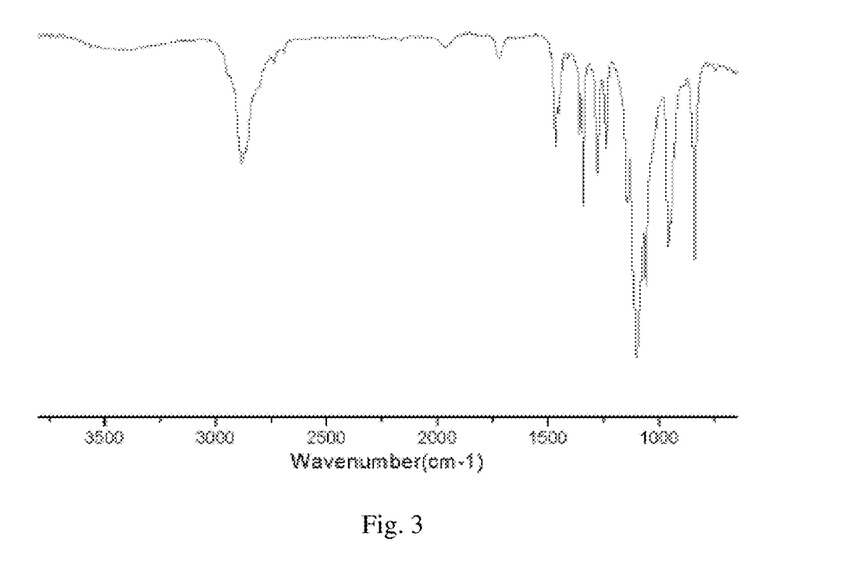
FIG. 3 is an IR spectrum of Sample TPEG30 according to Example 2.

It is found through comparison of the IR spectra of DMAEMA and TPEG that in the IR spectrum of TPEG 30, a C=C vibration peak at 1640 $cm^{-1}$ of DMAEMA is disappeared, suggesting that the raw material DMAEMA is successfully polymerized. In the IR spectrum of TPEG 30, there are a C=O vibration peak appeared at 1721 $cm^{-1}$ and a C—O—C vibration peak appeared at 1104-1146 $cm^{-1}$, suggesting that the DMAEMA and the TPEG are successfully polymerized into TPEG 30, as shown in FIG. 3. The 1H-NMR spectrum of TPEG 30 shows a methyl proton signal (—N(CH$_3$)$_2$) of DMAEMA detected at 2.19 ppm; a methylene proton signal (—CH$_2$—N(CH$_3$)$_2$) of DMAEMA detected at 2.63 ppm; a methylene proton signal (—CH$_2$—CH$_2$—O—) of TPEG detected at 3.52 ppm; and a terminal —OH proton signal of TPEG detected at 3.11 ppm. The 1H-NMR spectrum shows that the DMAEMA and the TPEG are successfully polymerized into TPEG 30.

Figure 4:
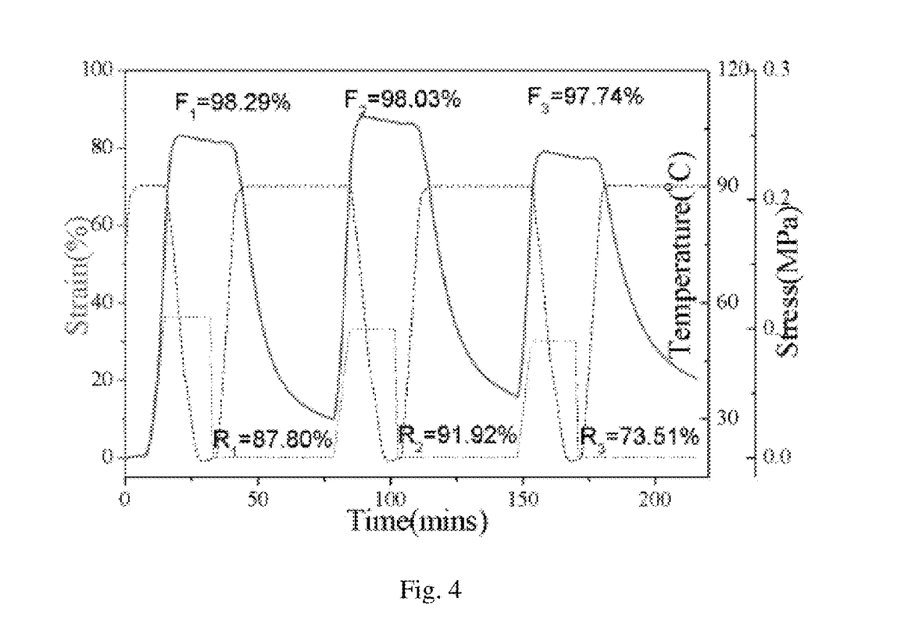
FIG. 4 is a dual-shape-memory cyclic curve of Sample TPEG30 according to Example 2.

The prepared sample TPEG30 exhibits a good dual shape memory performance. As shown in FIG. 4, the initial shape fixity ratio is about 98.29%, and the primary shape recovery ratio is about 87.80%; the secondary shape fixity ratio is about 98.03%, and the secondary shape recovery ratio is about 91.92%; and the tertiary shape fixity ratio is about 97.74%, and the tertiary shape recovery ratio is about 73.51%.

Example 3

Under the protection of nitrogen, methyl allyl polyethenoxy ether (TPEG2400, 40 g), 2-(dimethylamino)ethyl methacrylate (DMAEMA, 60 g), and water (200 g) were sequentially added to a three-neck flask, and then an initiator ammonium persulfate (5 mM) was additionally added, and reacted at 50° C. for 24 hrs with stirring. After reaction, the polymer in the solution was adjusted to have a mass fraction of 10%, then poured into a mold, dried for 24 hrs in an air-blowing drier at 100° C., and then dried for 12 hrs under vacuum, to obtain a shape memory polymer, which is designated as TPEG 40 (where 40 indicates that the amount of the raw material TPEG accounts for 40% of the total weight of the raw materials TPEG and DMAEMA).

Figure 5:
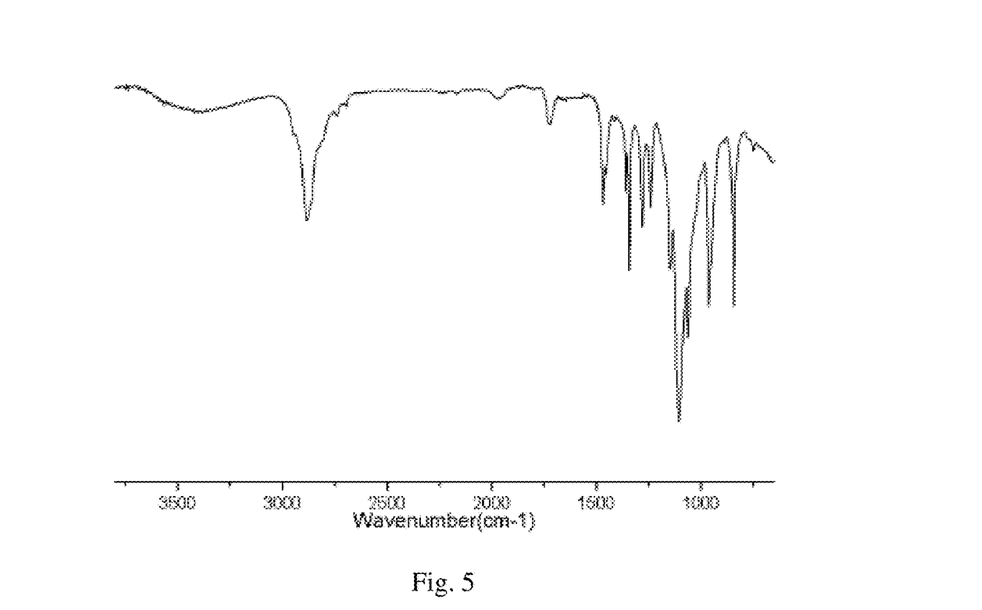
FIG. 5 is an IR spectrum of Sample TPEG40 according to Example 3.

It is found through comparison of the IR spectra of DMAEMA and TPEG that in the IR spectrum of TPEG 40, a C=C vibration peak at 1640 $cm^{-1}$ of DMAEMA is disappeared, suggesting that the raw material DMAEMA is successfully polymerized. In the IR spectrum of TPEG 40, there are a C=O vibration peak appeared at 1721 $cm^{-1}$ and a C—O—C vibration peak appeared at 1104-1146 $cm^{-1}$, suggesting that the DMAEMA and the TPEG are successfully polymerized into TPEG 40, as shown in FIG. 5. The 1H-NMR spectrum of TPEG 40 shows a methyl proton signal (—N(CH$_3$)$_2$) of DMAEMA detected at 2.19 ppm; a methylene proton signal (—CH$_2$—N(CH$_3$)$_2$) of DMAEMA detected at 2.63 ppm; a methylene proton signal (—CH$_2$—CH$_2$—O—) of TPEG detected at 3.52 ppm; and a terminal —OH proton signal of TPEG detected at 3.11 ppm. The 1H-NMR spectrum shows that the DMAEMA and the TPEG are successfully polymerized into TPEG 40.

Figure 6:
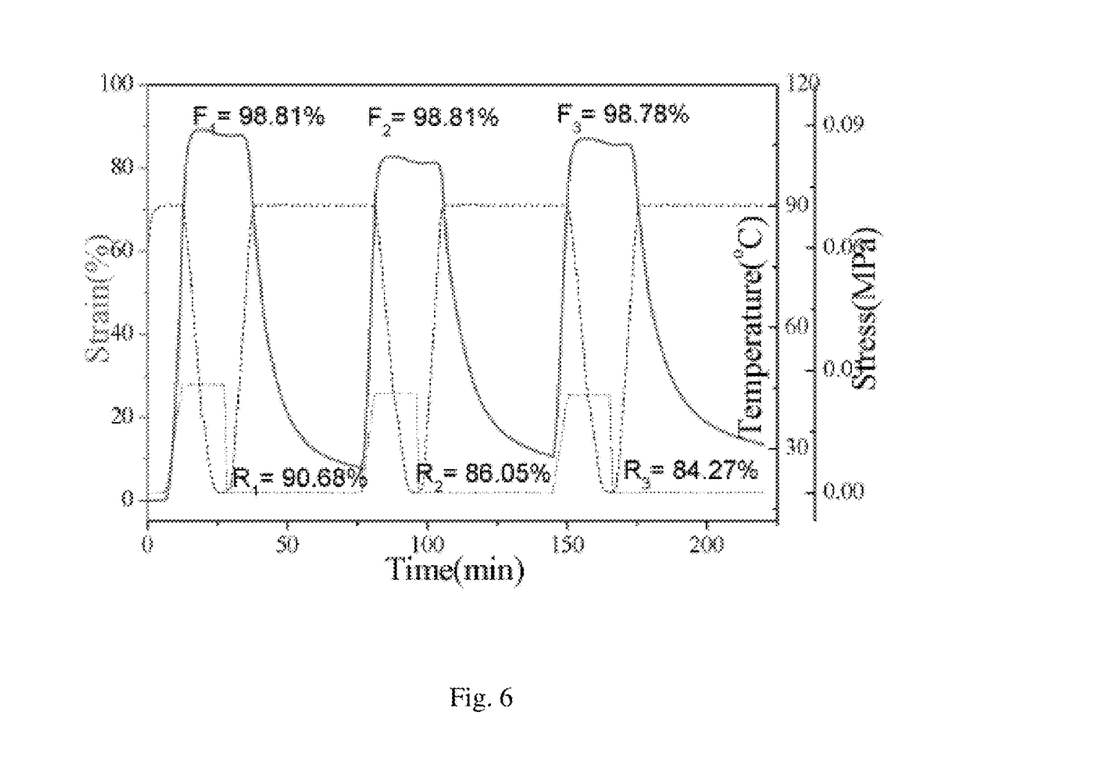
FIG. 6 is a dual-shape-memory cyclic curve of Sample TPEG40 according to Example 3.

The prepared sample TPEG40 exhibits a good shape memory performance. As shown in FIG. 6, the initial shape fixity ratio is about 98.81%, and the primary shape recovery ratio is about 90.68%; the secondary shape fixity ratio is about 98.81%, and the secondary shape recovery ratio is about 86.05%; and the tertiary shape fixity ratio is about 97.78%, and the tertiary shape recovery ratio is about 84.27%.

Example 4

Under the protection of nitrogen, methyl allyl polyethenoxy ether (TPEG2400, 50 g), 2-(dimethylamino)ethyl methacrylate (DMAEMA, 50 g), and water (200 g) were sequentially added to a three-neck flask, and then an initiator ammonium persulfate (5 mM) was additionally added, and reacted at 60° C. for 10 hrs with stirring. After reaction, the polymer in the solution was adjusted to have a mass fraction of 20%, then poured into a mold, dried for 24 hrs in an air-blowing drier at 80° C., and then dried for 10 hrs under vacuum, to obtain a shape memory polymer, which is designated as TPEG 50 (where 50 indicates that the amount of the raw material TPEG accounts for 50% of the total weight of the raw materials TPEG and DMAEMA).

Figure 7:
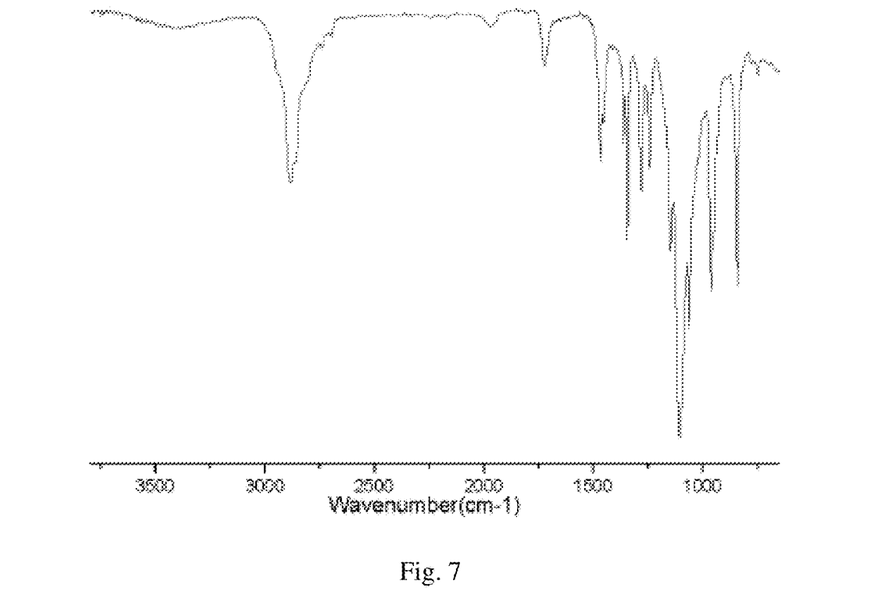
FIG. 7 is an IR spectrum of Sample TPEG50 according to Example 4.
Figure 8:
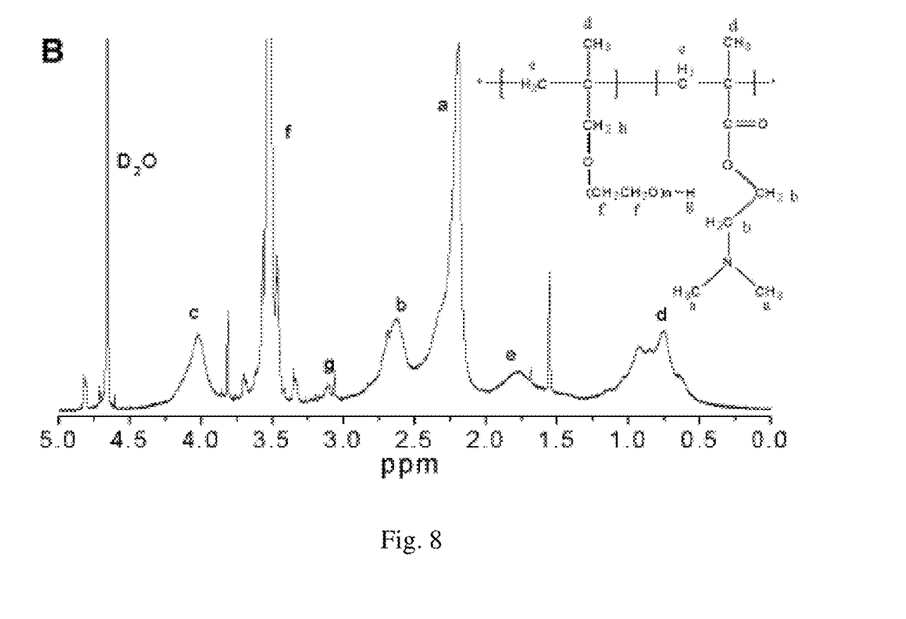
FIG. 8 is an NMR spectrum of Sample TPEG50 according to Example 4.

It is found through comparison of the IR spectra of DMAEMA and TPEG that in the IR spectrum (See FIG. 7) of TPEG 50, a C=C vibration peak at 1640 $cm^{-1}$ of DMAEMA is disappeared, suggesting that the raw material DMAEMA is successfully polymerized. In the IR spectrum of TPEG 50, there are a C=O vibration peak appeared at 1721 $cm^{-1}$ and a C—O—C vibration peak appeared at 1104-1146 $cm^{-1}$, suggesting that the DMAEMA and the TPEG are successfully polymerized into TPEG 50, as shown in FIG. 7. The 1H-NMR spectrum (see FIG. 8) of TPEG 50 shows a methyl proton signal (—N(CH$_3$)$_2$) of DMAEMA detected at 2.19 ppm; a methylene proton signal (—CH$_2$—N(CH$_3$)$_2$) of DMAEMA detected at 2.63 ppm; a methylene proton signal (—CH$_2$—CH$_2$—O—) of TPEG detected at 3.52 ppm; and a terminal —OH proton signal of TPEG detected at 3.11 ppm. The 1H-NMR spectrum shows that the DMAEMA and the TPEG are successfully polymerized into TPEG 50.

Figure 9:
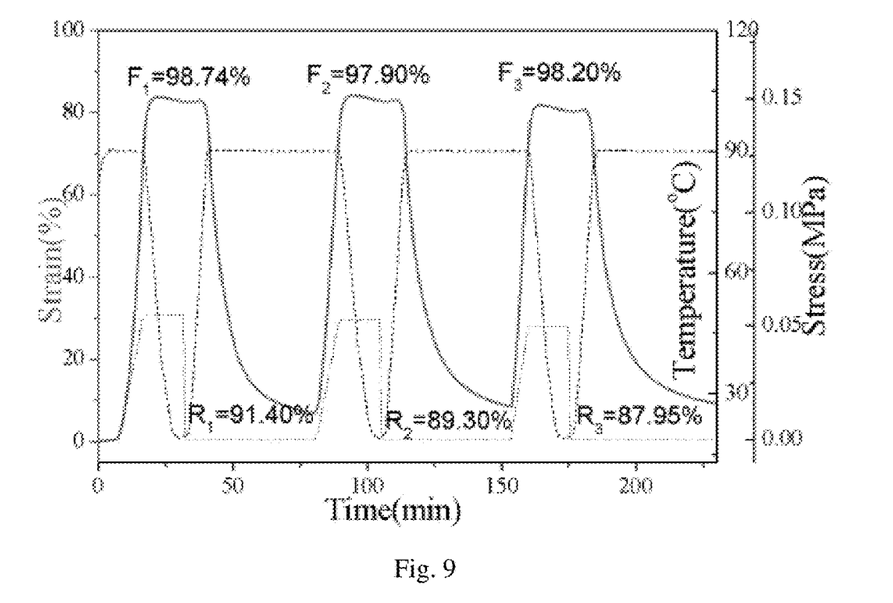
FIG. 9 is a dual-shape-memory cyclic curve of Sample TPEG50 according to Example 4.

The prepared sample TPEG50 exhibits a good shape memory performance. As shown in FIG. 9, the initial shape fixity ratio is about 98.74%, and the primary shape recovery ratio is about 91.40%; the secondary shape fixity ratio is about 97.90%, and the secondary shape recovery ratio is about 89.30%; and the tertiary shape fixity ratio is about 98.20%, and the tertiary shape recovery ratio is about 87.95%.

Example 5

Under the protection of nitrogen, methyl allyl polyethenoxy ether (TPEG2400, 60 g), 2-(dimethylamino)ethyl methacrylate (DMAEMA, 40 g), and water (200 g) were sequentially added to a three-neck flask, and then an initiator ammonium persulfate (5 mM) was additionally added, and reacted at 60° C. for 10 hrs with stirring. After reaction, the polymer in the solution was adjusted to have a mass fraction of 20%, then poured into a mold, dried for 24 hrs in an air-blowing drier at 60° C., and then dried for 24 hrs under vacuum, to obtain a shape memory polymer, which is designated as TPEG 60 (where 60 indicates that the amount of the raw material TPEG accounts for 60% of the total weight of the raw materials TPEG and DMAEMA).

Figure 10:
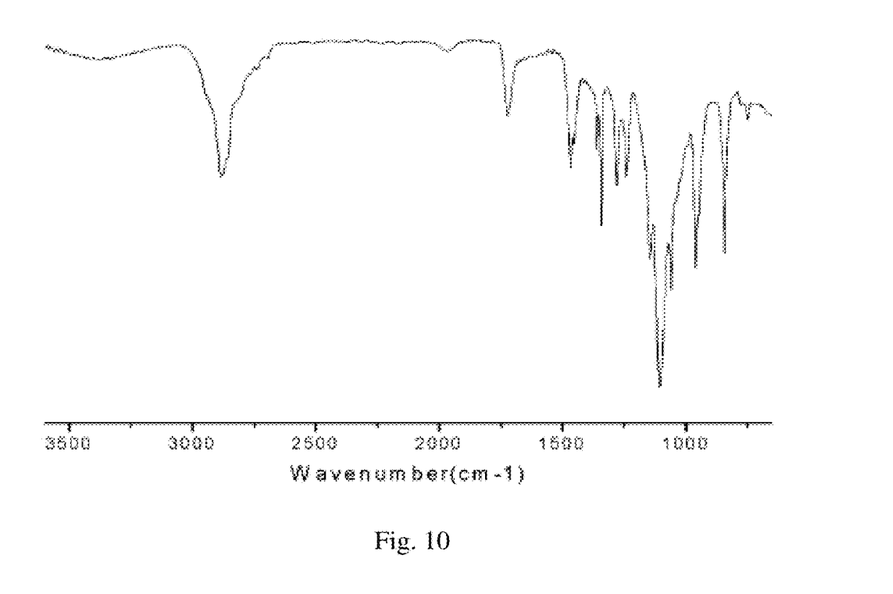
FIG. 10 is an IR spectrum of Sample TPEG60 according to Example 5.

It is found through comparison of the IR spectra of DMAEMA and TPEG that in the IR spectrum of TPEG 60, a C=C vibration peak at 1640 cm$^{-1}$ of DMAEMA is disappeared, suggesting that the raw material DMAEMA is successfully polymerized. In the IR spectrum of TPEG 60, there are a C=O vibration peak appeared at 1721 cm$^{-1}$ and a C—O—C vibration peak appeared at 1104-1146 cm$^{-1}$, suggesting that the DMAEMA and the TPEG are successfully polymerized into TPEG 60, as shown in FIG. 10. The 1H-NMR spectrum of TPEG 60 shows a methyl proton signal (—N(CH$_3$)$_2$) of DMAEMA detected at 2.19 ppm; a methylene proton signal (—CH$_2$—N(CH$_3$)$_2$) of DMAEMA detected at 2.63 ppm; a methylene proton signal (—CH$_2$—CH$_2$—O—) of TPEG detected at 3.52 ppm; and a terminal —OH proton signal of TPEG detected at 3.11 ppm. The 1H-NMR spectrum shows that the DMAEMA and the TPEG are successfully polymerized into TPEG 60.

Example 6

Under the protection of nitrogen, methyl allyl polyethenoxy ether (TPEG2400, 80 g), 2-(dimethylamino)ethyl methacrylate (DMAEMA, 20 g), and water (200 g) were sequentially added to a three-neck flask, and then an initiator ammonium persulfate (5 mM) was additionally added, and reacted at 60° C. for 10 hrs with stirring. After reaction, the polymer in the solution was adjusted to have a mass fraction of 20%, then poured into a mold, dried for 24 hrs in an air-blowing drier at 60° C., and then dried for 24 hrs under vacuum, to obtain a shape memory polymer, which is designated as TPEG 80 (where 80 indicates that the amount of the raw material TPEG accounts for 80% of the total weight of the raw materials TPEG and DMAEMA).

Figure 11:
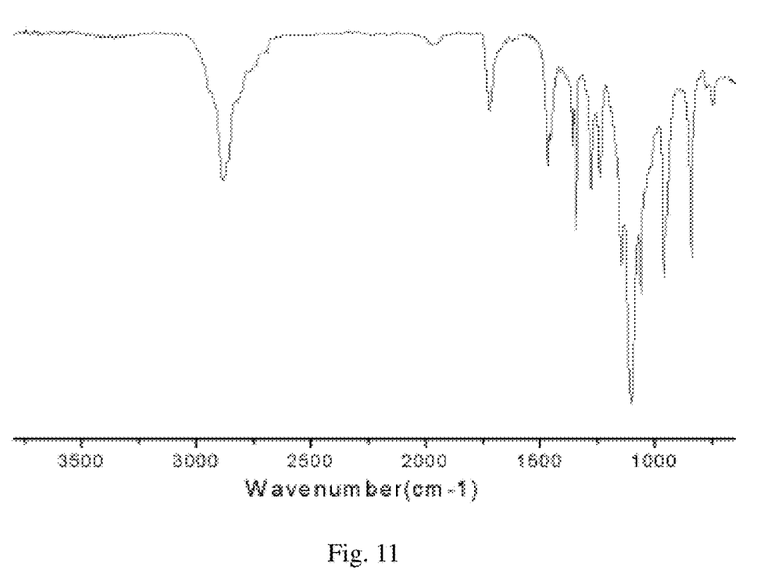
FIG. 11 is an IR spectrum of Sample TPEG80 according to Example 6.

It is found through comparison of the IR spectra of DMAEMA and TPEG that in the IR spectrum of TPEG 80, a C=C vibration peak at 1640 cm$^{-1}$ of DMAEMA is disappeared, suggesting that the raw material DMAEMA is successfully polymerized. In the IR spectrum of TPEG 80, there are a C=O vibration peak appeared at 1721 cm$^{-1}$ and a C—O—C vibration peak appeared at 1104-1146 cm$^{-1}$, suggesting that the DMAEMA and the TPEG are successfully polymerized into TPEG 80, as shown in FIG. 11. The 1H-NMR spectrum of TPEG 80 shows a methyl proton signal (—N(CH$_3$)$_2$) of DMAEMA detected at 2.19 ppm; a methylene proton signal (—CH$_2$—N(CH$_3$)$_2$) of DMAEMA detected at 2.63 ppm; a methylene proton signal (—CH$_2$—CH$_2$—O—) of TPEG detected at 3.52 ppm; and a terminal —OH proton signal of TPEG detected at 3.11 ppm. The 1H-NMR spectrum shows that the DMAEMA and the TPEG are successfully polymerized into TPEG 80.

Figure 12:
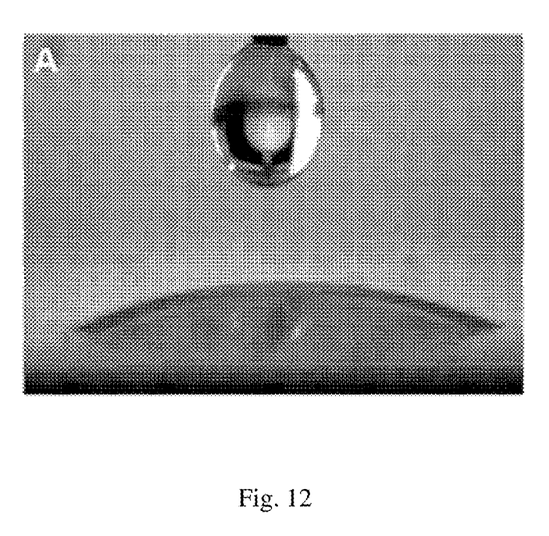
FIG. 12 shows a contact angle tested for Sample TPEG80 according to Example 6.

The result of contact angle test of TPEG80 prepared in Example 6 is shown in FIG. 12. The static contact angle of the sample is about 24°, indicating that the sample has a high hydrophilicity. Meanwhile, as is well known, polyethylene glycol is a highly biocompatible polymer having a good hydrophilicity. Therefore, the contact angle test indicates that Sample TPEG80 also has a good biocompatibility.

Figure 13:
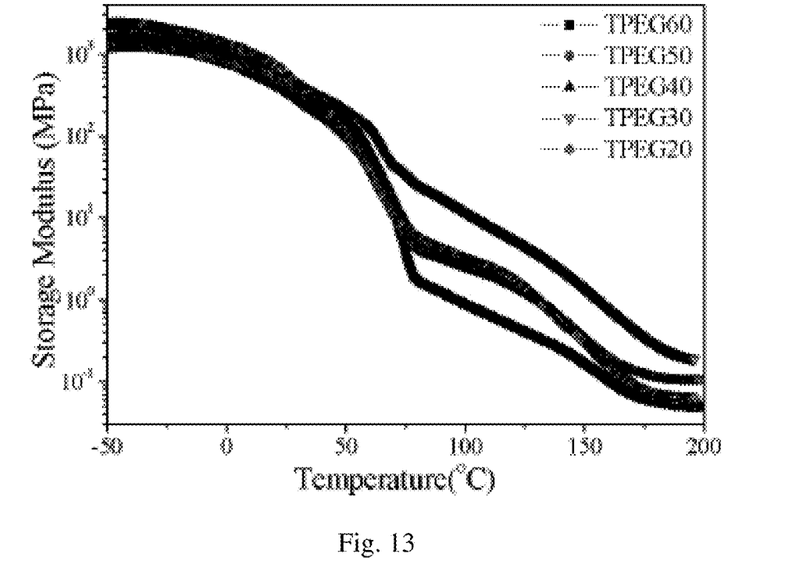
FIG. 13 shows dynamic mechanical property curves of the samples according to Examples 1-5.
Figure 14:
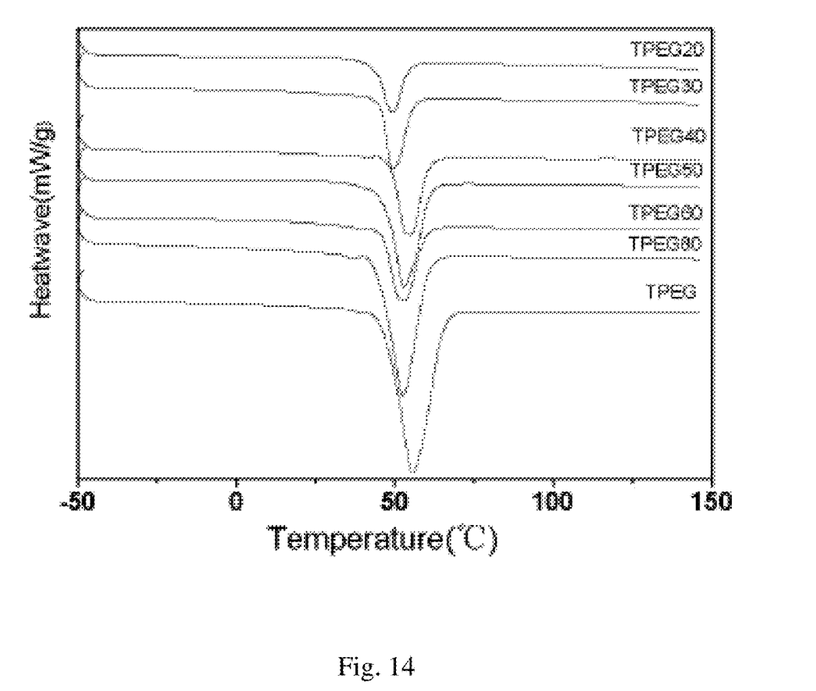
FIG. 14 shows DSC curves of the samples according to Examples 1-6.

The shape memory polymers prepared in Examples 1-6 were analyzed by an elemental analyzer. The result is shown in Table 1. The dynamic mechanical properties of the shape memory polymers prepared in Example 1-5 are shown in FIG. 13. The thermal properties of the shape memory polymers prepared in Example 1-6 are shown in FIG. 14.

TABLE 1

Elemental analysis of shape memory polymers

| Sample | Weight ratio of raw materials (DMAEMA:TPEG) | Elemental composition | | | | Content in the polymer | |
|---|---|---|---|---|---|---|---|
| | | N | C | H | S | TPEG | DMAEMA |
| TPEG20 | 8:2 | 6.21 | 57.07 | 9.23 | 0.19 | 30.27 | 69.73 |
| TPEG30 | 7:3 | 5.26 | 26.11 | 9.15 | 0.19 | 40.93 | 59.07 |
| TPEG40 | 6:4 | 4.63 | 56.20 | 9.13 | 0.17 | 48.00 | 52.00 |
| TPEG50 | 5:5 | 4.17 | 55.67 | 9.08 | 0.22 | 53.17 | 46.83 |
| TPEG60 | 4:6 | 2.93 | 54.39 | 9.02 | 0.19 | 67.10 | 32.90 |
| TPEG80 | 2:8 | 1.41 | 51.80 | 9.31 | 0.23 | 84.17 | 15.83 |

Note:
calculated based on the weight of nitrogen atom.

The invention claimed is:

1. A shape memory polymer formed by polymerizing methyl allyl polyethenoxy ether and 2-(dimethylamino)ethyl methacrylate, having a structure represented by Formula I:

Formula I

2. The shape memory polymer according to claim 1, wherein the weight ratio of the raw materials methyl allyl polyethenoxy ether to 2-(dimethylamino)ethyl methacrylate is 8:2-2:8.

3. The shape memory polymer according to claim 1, wherein the weight ratio of methyl allyl polyethenoxy ether to 2-(dimethylamino)ethyl methacrylate in the polymer is 8:2-2:8.

4. The shape memory polymer according to claim 1, wherein the shape memory polymer has a molecular weight of 10000-100000.

5. A method for preparing the shape memory polymer according to claim 1, comprising: adding methyl allyl polyethenoxy ether, 2-(dimethylamino)ethyl methacrylate, water and an initiator, under the protection of a protective gas, reacting at 50-80° C. for 8-24 hrs with stirring, and drying, to obtain the shape memory polymer.

6. The preparation method according to claim 5, wherein the protective gas is nitrogen; and the water is added in an amount of 2-3 times of the total weight of the methyl allyl polyethenoxy ether and the 2-(dimethylamino)ethyl methacrylate.

7. The preparation method according to claim 5, wherein the initiator is ammonium persulfate, and used in an amount of 5-10 mM.

8. The preparation method according to claim 5, wherein the reaction is stirred at 60° C. for 10 hrs.

9. The preparation method according to claim 5, wherein the drying is done through a process comprising: adjusting the mass fraction of the polymer in the solution to 10-30% after reaction, then pouring the solution into a mold, drying for 12-24 hrs in an air-blowing drier at 80-100° C., and then drying for 12-24 hrs under vacuum, to obtain the shape memory polymer.

* * * * *